May 28, 1968  C. MEYER  3,385,472

ENERGY CONSUMPTION METERING AND INVOICING MEANS

Original Filed Oct. 19, 1965  3 Sheets-Sheet 1

INVENTOR
CARLO MEYER

BY
Morgan, Finnegan, Durham & Pine
ATTORNEYS

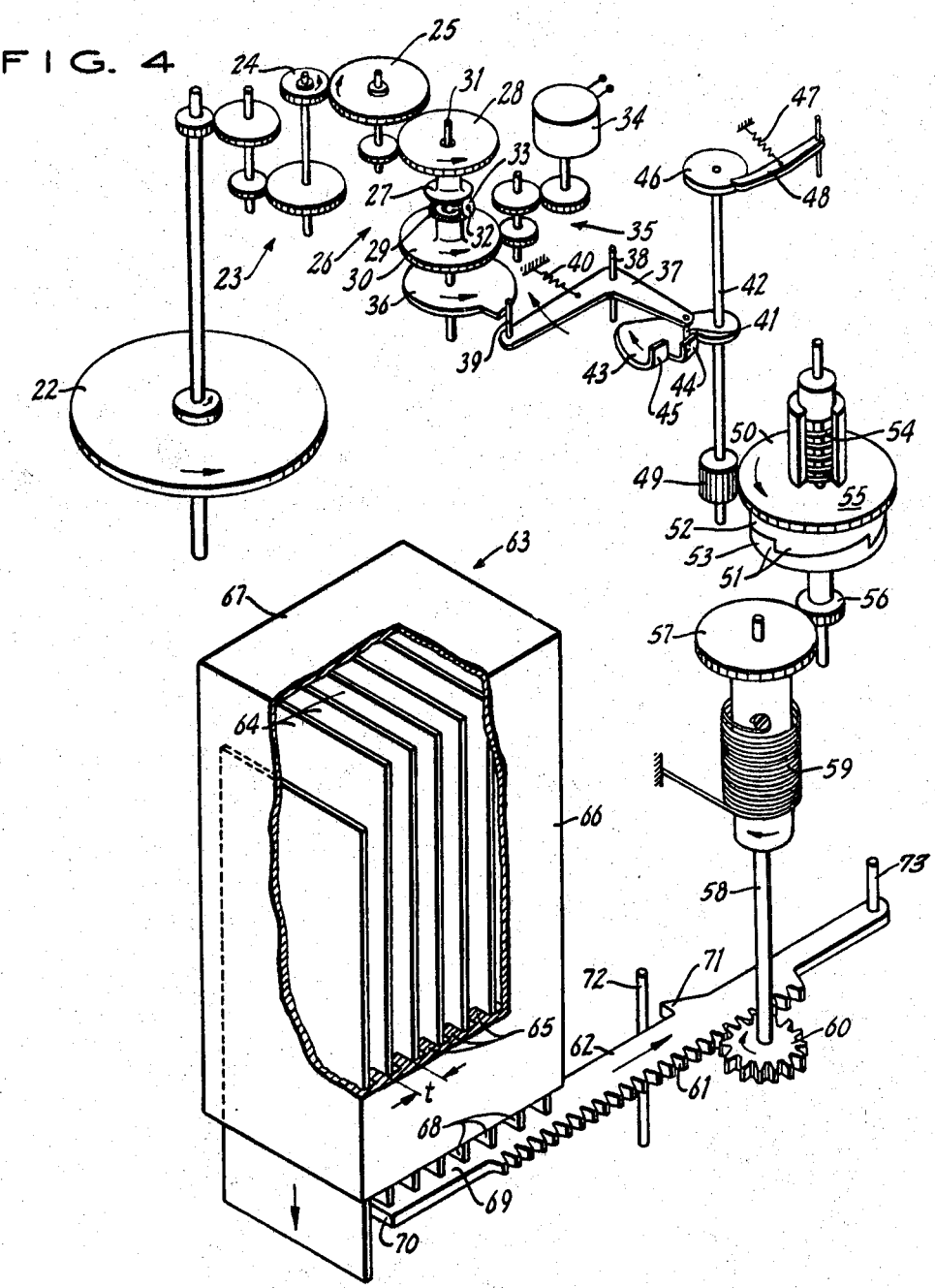

INVENTOR
CARLO MEYER
BY
Morgan, Finnegan, Durham & Pine
ATTORNEYS

United States Patent Office 3,385,472
Patented May 28, 1968

3,385,472
ENERGY CONSUMPTION METERING AND
INVOICING MEANS
Carlo Meyer, Zug, Switzerland, assignor to Electrometre
SA, Zug, Switzerland, a body corporate of Switzerland
Continuation of application Ser. No. 497,710, Oct. 19,
1965. This application May 24, 1966, Ser. No. 552,638
Claims priority, application Switzerland, Apr. 27, 1961,
4,928/61
13 Claims. (Cl. 221—91)

This is a continuation of application Ser. No. 497,710 filed Oct. 19, 1965, which is a continuation of application Ser. No. 363,956 filed Apr. 30, 1964, which in turn is a continuation of originally filed application Ser. No. 189,913, filed Apr. 24, 1962, now abandoned.

It is known to supply and charge for electrical energy or gas on the basis of an advance payment of money in an amount previously fixed for the consumer. For such methods of charging there are electricity and gas meters which are adapted for the insertion of coins thus making it possible to consume an amount of electrical energy or gas corresponding to the coin inserted. The disadvantage of these charging methods and of the meters used therewith is that they involve the necessity of having a collection agent visit the consumer from time to time to remove the coins from the meter; this system is also susceptible to monetary losses, for example through theft.

Meters have already been developed which employ, instead of coins, special tokens, such as metal counters, cards, plugs or other mechanical actuating members, which the consumer purchases in advance from the supply undertaking and by means of which the meter is then connected to the supply network as in the case of coin-insertion meters. It is true that these last-mentioned advance payment systems protect the supply undertakings from monetary losses incurred possibly through theft, but they still necessitate regular visits from an agent of the undertaking, since the meter, like the coin-insertion type has to be periodically emptied of the accumulated metal counters, cards, or the like, i.e. put in order for further use. Moreover, whether coins or other tokens are used, all these advance payment systems have the great disadvantage of needing relatively complex meter devices, which are therefore expensive and liable to develop faults. These systems have the additional disadvantage of being often heartily disliked, particularly by heavy consumers.

Such advance payment systems are therefore generally used only by a fraction of the consumers, while the majority are, in known manner, supplied from the general supply network on credit, i.e. against payment which is effected only after consumption for a given period, for example a month. But with known supply and charging systems, as with the above-mentioned advance payment systems, an agent has to visit the consumer regularly, usually at even shorter intervals—not in this case to collect the money or empty the meter of other tokens, but rather to read the meter. Such supply and charging methods based on credit also require an extensive, costly organization to make out the bills individually, since these vary widely and do not generally contain round sums. Known charging methods based on credit and simply using reading meters have many additional disadvantages. For example, inadvertent or even deliberate errors can easily be made in reading the meter, involving the supply undertaking or the consumer in financial loss; and the reading of the meter may also lead to unpleasant arguments between the consumer and the supply undertaking or its appointed reader. Nor are the conditions always present for the meter to be installed in the consumer's house in the desirable manner so that it can be read easily and correctly, apart from the aforementioned human shortcomings; on the other hand the consumer or the architect cannot always be expected to see that the meter is installed so that it can be read satisfactorily.

The regular visits from the meter-reader, who has to come into the house, are often resented by the consumer, particularly in snowy or rainy weather.

The plan contemplated by the electric utility of introducing the two-monthly energy-consumption period instead of the monthly period, i.e. the plan of extending the reading period in order to rationalize the settlement system, has the drawback of a corresponding loss of interest; it is also clearly rejected by the consumers, who generally prefer to pay their bills at shorter intervals.

Quite apart from the aforementioned deficiencies, however, both known charging methods described above, i.e. the advance payment and the credit system, also suffer from the following additional disadvantages:

While it is true that with the advance payment charging system, for example, using a coin-insertion meter, the dual tariff principle can be applied in known manner to adapt the cost to individual consumption; nevertheless, meters such as coin-insertion meters used for this purpose (which are in any event complex and liable to faults) become still more expensive and failure prone than they were as single-tariff meters. Such dual-tariff meters working on the advance payment basis also share of course, the other disadvantages of single-tariff meters adapted for advance payment (e.g., single-tariff coin-insertion meters), namely, the necessity for periodic collection of the coins inserted and the consumer's dislike of the advance payment system.

Although the dual or multiple tariff technique is used to advantage in the charging method based on credit, such meters have great drawbacks which result from the fact that several separate readings, i.e. at least two with dual-tariff meters, have to be taken by the reader each time the meter is read. This naturally increases not only the work and time of the reader, but also increases the already considerable risk of incorrect readings. This charging method based on credit and a multiple tariff also necessarily involves a complex charging and accounting procedure and is therefore very prone to error and time-consuming effort.

Compared to charging methods based on advance payment, those based on credit have yet another disadvantage. In those methods based on advance payment, using, for example, a coin-insertion meter, round sums corresponding to the unit value of the coin used are charged, booked and paid, thus avoiding laborious calculation which is time-consuming and subject to error. On the other hand, known charging methods based on credit, and the apparatus they employ, have the disadvantage that extensive calculations, which are subject to error, must be made to determine the amount to be paid by the consumer for the amount of the commodity which he has tapped from the supply network, and the invoice arrived at is not generally a round sum. Quite apart from the likelihood of errors being made in determining the amount consumed (for example kwh. of electrical energy, $m^3$ of gas), which errors may be due to incorrect reading or recording or to sheer miscalculation in working out the difference between two successive meter readings, disadvantages also arise from the fact that the difference thus arrived at, not being a round amount, is still short of indicating the amount of money to be paid by the consumer. It is only by multiplying the unit-price by the number of quantity-units of the medium consumed (for example, \$0.07/kwh.×53 kwh.=\$3.71) that the amount to be paid by the consumer at the end of the reading period is finally obtained. Like the amount consumed, the money payable for it is far from being a round sum but contains decimals right down to the smallest monetary unit. Such invoice amounts not expressed in a round sum, often lead to the most unsatisfactory measure of carrying over the last decimals of the amount payable, particularly with present devices and meters used with the charging method based on credit. It is obvious that the consequences of having non-round sums payable under the charging system based on credit become all the more disadvantageous when two or even more tariffs are used instead of the one tariff ("single tariff").

Charging methods and devices have also been proposed recently which to a great extent avoid the disadvantages of the aforementioned charging methods based on advance payment and credit. These methods and apparatus are still based on credit settlement but not with the customary settlement at regular intervals. It is effected instead each time a fixed consumption amount is reached, this amount being arranged in advance for the consumer in question and being, for example, in kwh. in the case of electrical energy consumption and the charging therefor. Here settlement is effected each time the reading on the consumer's meter has increased by the predetermined fixed consumption amount. This apparatus is constructed to eject an invoice slip automatically when the predetermined consumption amount has been reached. Of course this slip does not give a meter reading, since the amount consumed is always the same from invoice to invoice, i.e. invariable. However this apparatus cannot be used in its existing form to apply a compound tariff such as a multiple tariff, basic charges tariff, block or maximum tariff, etc.

Finally, all known charging methods, whether they are based on advance payment or credit, have the disadvantage of requiring a separate meter apparatus for each medium consumed, for example gas or electrical energy; charging, booking and payment must accordingly also be effected separately. This however, involves a compounding of the previously mentioned disadvantages inherent in the known charging methods.

If one compares today the extent to which the two methods described are used for supplying consumers from the public network, it will be found that the charging method based on credit, although it has grave disadvantages, is generally preferred to the advance payment method; above all, consumers' wishes are here taken into account in choosing the charging system.

It is accordingly one object of the invention to provide a charging apparatus based on credit which avoids the disadvantages of known charging methods based on credit but retains their advantages.

These and other objects and advantages of the invention will be set forth in part hereinafter and in part will be obvious herefrom or may be learned by practice with the invention, the same being realized and attained by means of the instrumentalities and means pointed out in the appended claims.

The invention is based on a new system of arrears settlement for consumption. The old system of settlement at regular intervals, possibly monthly or quarterly, is replaced by a new system of effecting settlement each time a fixed amount of money is reached. This amount is determined in advance for the consumer in question and is referred to in the following as the "fixed unit amount" or more briefly as the "unit amount."

According to the invention, settlement takes place each time the consumer has used or drawn from the public supply network an amount of the flowing medium concerned, for example electrical energy, corresponding to the amount of money fixed for him or agreed on between him and the supply utility, the selected value of the "fixed unit amount" preferably being a round sum convenient for the payment transaction.

The "fixed unit amount" will have to be varied in size according to the particular type of consumption and the average amount currently consumed by the recipient. With electricity, for example, for small households, $3.00 or $4.00 might be a desirable monthly "unit amount," for larger households perhaps $8.00, and finally for industrial consumers, for example $1000.00 or more, according to the size of the undertaking. When the "unit amount" is adapted in this way to the special conditions currently obtaining for the various categories of consumers it is desirable to draw up various groups of consumers with graduated unit amounts.

A prerequisite of the system according to the invention and its application is of course a measuring instrument (for example a meter) which is connected between the supply network and the consumer's installation connected thereto and which measures the quantity of energy or material withdrawn by the consumer in known manner.

The invention accordingly relates to an apparatus for charging for the consumption of a flowing medium such as electricity, gas or liquid by a consumer connected to the supply network, wherein a consumption measuring apparatus, connected between the supply network and the consumer's installation, is coupled to additional apparatus which computes consumption costs calculated according to two or more rates and automatically issues bills identifying the consumer and the consumption measuring apparatus when a predetermined cost is reached.

The invention consists in the novel parts, constructions, arrangements, combinations and improvements herein shown and described.

Further features and further constructions of the invention are explained with reference to the description hereinbelow of several exemplary embodiments of the invention.

The drawings include diagrams which, using the example based on withdrawal of electrical energy from the network, clarify the essential difference between the various charging methods and thereby illustrate the principle of the charging method on which the apparatus according to the invention is based. Further figures illustrate exemplary constructions of an electricity meter according to the invention:

In the drawings:

FIGURE 4 is a schematic drawing of an apparatus for carrying out the charging method of FIGURE 2 in the case of a basic charge;

Figure 1:
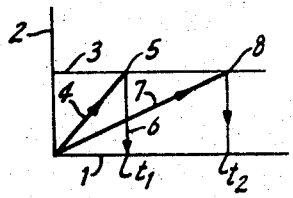
FIGURE 1 is a diagram illustrating the known charging method based on a predetermined consumption quantity.

In the diagram of FIGURE 1 the abscissa 1 gives consumption time units such as hours, and the ordinate 2 gives consumption quantity units such as kwh. For representing a predetermined fixed consumption quantity (kwh.), a line 3 is drawn in the diagram, running parallel to the abscissa 1, i.e. horizontally. The consumer's use of electrical energy from the supply network is represented in the diagram by an obliquely rising consumption line 4 which is of constant slope when consumption is uniform, i.e. when the rate of consumption is constant. The consumption line 4 cuts the line 3 at a point 5. The vertical line 6, brought down from the point 5 to the abscissa 1, provides the coordinate point $t_1$. The point $t_1$ accordingly indicates the instant of time $t$ when, at the consumption rate 4, the total consumption has reached the predetermined consumption quantity 3.

The diagram of FIGURE 1 also shows that when a smaller amount of electrical energy is constantly used the predetermined consumption quantity 3 is reached at a later point of time $t_2$; the consumption line 7, which rises more obliquely than the line 4 corresponding to the lower consumption rate, does not intercept the line 3 representing the predetermined fixed consumption quantity, until much later than when the rate is as represented by the line 4. The later-occurring intercept is represented by point 8. Compared with consumption according to the line 4, therefore, it takes a correspondingly longer period with consumption according to the line 7 to reach the predetermined fixed consumption quantity 3. If with a rate of consumption 4, the predetermined consumption quantity was reached at the point of time $t_1$, then with the lower consumption rate 7, it will be reached only at the later point of time $t_2$. If a bill is automatically released each time consumption reaches the predetermined quantity 3, then it is obvious that with the higher consumption 4, the bill will be issued earlier than with the lower consumption 7, namely at time $t_1$ as compared with the later time $t_2$.

The time $t$ in which the predetermined consumption quantity is reached and at which time the bill is issued, is therefore in this case variable. In this case settlement is made and the bill issued not when a predetermined energy-supplying time ("reading period") has been reached but rather, each time a predetermined, invariable quantity of energy has been reached. The time when this quantity is reached depends only on the rate at which the consumer uses energy.

Figure 2:
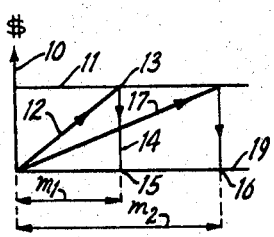
FIGURE 2 is a diagram illustrating the charging method based on a predetermined amount of money, which method serves as a basis for the apparatus according to the invention.

In the diagram of FIGURE 2 which, like FIGURE 1, is also applicable to the automatic issuing of bills, the abscissa 9 gives consumption quantity units, such as kwh., and the ordinate 10 gives money-value units, for example dollars. A predetermined amount of money is represented in the diagram by the line 11, running parallel to the abscissa 9, i.e. horizontally. If the consumer uses electrical energy from the supply network at a given tariff I, this appears in the diagram as an obliquely rising consumption line 12 which is straight when consumption is uniform, i.e. when the rate of consumption remains constant. The consumption line 12, characterizing the tariff I, intercepts the line 11 at a point 13. As in FIGURE 1, a vertical line 14 drawn from the point 13 to the abscissa 9 provides a point 15 which indicates what quantity $m_1$ of electrical energy in kwh. the consumer has tapped from the public supply network at tariff I in the course of his consumption 12 before expenditure of the amount of money 11 fixed for him. This is the amount on which settlement is based, i.e. a bill is issued for this amount.

The diagram of FIGURE 2 also shows that in the case of a tariff II, which is lower than the tariff I, the bill, rather than being issued following consumption of the amount $m_1$ at the point 15, is issued following consumption of an amount $m_2$, greater than the amount $m_1$, this greater amount being indicated at a point 16 which is arrived at, like the point 15, with the aid of a corresponding consumption line 17. If, for example, tariff I=$G_1$ money units and if the cheaper tariff II=$G_2$=0.5 $G_1$, the bill for the predetermined fixed monetary amount corresponding with tariff II will be issued following consumption of the amount $m_2$, equal to $2m_1$. The consumption line 17 for the lesser tariff II accordingly rises only at half the inclination of the line 12 for the higher tariff I. FIGURE 2 shows these relationships approximately. In this case, therefore, settlement is made and the bill issued not following the supply of a predetermined quantity of the medium, for example in kwh. for electrical energy, as with the charging method of FIGURE 1 (see line 3 of FIGURE 1), but rather, each time a fixed predetermined monetary amount is reached (see line 11 in FIGURE 2); in the latter case, the amount in kwh. which has to be consumed for a bill to be issued may be larger or smaller according to the tariff used.

Thus in this case settlement takes place and the bill is issued, not when a given energy-supplying time has been reached but rather after supply times of quite varied lengths, depending on whether the consumer has used energy at a high or low tariff and of course, as in FIGURE 1, depending on whether he has used much or little energy at this traiff, i.e. whether he has drawn energy from the supply network at a high or low rate.

Figure 3:
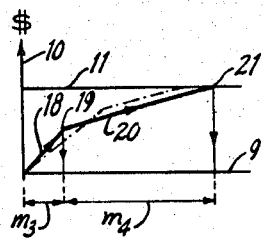
FIGURE 3 is a diagram illustrating the application of a dual tariff to the charging method of FIGURE 2.

In the diagram of FIGURE 3, in which the monetary amount (ordinate 10) is again coordinated with the consumption amount (abscissa 9) and the line 11 drawn in to represent a predetermined monetary sum, there is shown the effect of applying a dual traiff to the charging method of FIGURE 2 (predetermined monetary amount). Up to the point 19 consumption takes place at a high tariff I as shown by the consumption line 18. A low tariff II then becomes applicable as is shown in the diagram by the new consumption line 20 which begins at the point 19 and has a more oblique slope than the line 18. When the predetermined monetary amount is finally reached at a point 21 on the line 11, the bill is issued. Up to the moment corresponding to the point 21 there have been two different, successive types of consumption: first the consumption $m_3$ at the high tariff I and then the consumption $m_4$ at the low tariff II. Regardless of when consumption is switched over to the new tariff, regardless of which tariff is switched on and the number of switchings, and regardless too of the rate at which the consumer draws energy from the network at the tariff then used, a bill for this amount is always issued when the predetermined, fixed and invariable monetary amount is reached.

The diagram of FIGURE 3 also includes a dash-and-dot line. This represents consumption where the high tariff I is less than the high tariff 18 previously described but where the low tariff II is the same as before. This latter relationship is shown by the fact that the terminal section of the consumption line is parallel to the consumption line 20.

In FIGURE 4 the disc 22 of an electricity meter (not fully shown) turns in the direction of the arrow when electric energy is being consumed and, acting through a reduction gear 23, (which includes two enmeshing wheels 24 and 25 which can be exchanged for two corresponding wheels with a different gear ratio for the purpose of altering in the direction of the arrow and the other sun wheel 29 of which is fixed to a spur wheel 30. A spindle 32 is fixed to the planet wheel shaft 31, to which it is orthogonal, and seated on the spindle 32 for loose rotation is a planet wheel 33 which engages the two sun wheels 27 and 29. A synchronous motor 34 connected to the network continuously drives the spur wheel 30 and the sun wheel 29 fixed thereto in the direction of the arrow, through a reduction gear 35.

A cam plate 36 is fixed to the planet wheel shaft 31. This shaft turns in the direction of the arrow, being constantly driven by the synchronous motor 34 through the planet wheel 33 and also being driven by the disc 22 when energy is withdrawn from the network. An angle lever 37 is pivotally mounted on a shaft 38 and, by means of a pin 39, bears on the cam plate 36 under the action of a tension spring 40. The other free end of the angle lever 37 is provided with a pin 41 which is operatively connected to a brake wheel 43 fixed to a shaft 42, by the pin 41 acting as a stop in relation to two lugs (palettes) 44 and 45 on the wheel 43. A ratchet wheel 46 is also fixed to the shaft 42 and can be engaged by a ratchet 48 which is subject to the action of a tension spring 47. The flyback suppressor 46, 47, 48 is arranged so that the brake wheel 43 is prevented from executing a return movement from its stopped position and can only move in the direction of the arrow.

The shaft 42 is operatively connected to a shaft 58 through a pair of gearwheels 49, 50, a ratchet coupling 55 which comprises two coupling members 52 and 53 provided with ratchet claws 51 held in engagement by a spring 54, and two gear wheels 56 and 57.

The shaft 58 is adapted to move a toothed rack 61 through a pinion 60, the shaft being tensioned by a torsion spring 59 arranged concentrically therewith. The toothed rack 61 forms an integral part of a displaceable base 62 for a magazine 63 in which cards 64 are stored, the cards being arranged one behind the other in a straight storage row running parallel to the direction in which the base 62 is displaced. The cards are kept at an equal spacing $t$ from each other by comb-like projections 65 arranged on two opposed side walls 66 and 67 of the magazine 63.

The weight of the cards 64 enables them to be supported by their bottom front surfaces 68 on a level supporting surface 69 of the base 62. The cards are released individually in succession each time the displacement of the base 62 in the direction of the arrow makes a vertical front surface 70 at its end pass the bottom front surface 68 of the first card in the storage row; the lower front surface 68 of the card 64 thereby slides off the supporting surface 69 of the base 62. The base 62 has a lug 71 with which it strikes a stop pin 72 when it fully recloses the magazine 63 from below upon being returned to its starting position by manual actuation of a return pin 73 against the direction of the arrow. The torsion spring 59 is rewound simultaneously with the returning of the base 62, the backward movement of the toothed rack 61 causing it to drive the pinion 60 and thereby the shaft 58 in a rotary direction contrary to the direction of the arrow shown.

The reduction ratio of the gear provided in the path of action from the brake wheel 43 to the base 62 and formed by the two pairs of spur wheels 59, 50 and 56, 57 and the toothed rack drive 60, 61 is chosen, for example, so that one revolution of the brake wheel 43 results in displacement of the base 62 by the length of a storage division $t$.

The reduction ratio of the reduction gear 35, provided between the synchronous motor 34 and the sun wheel 29, is chosen so that, when there is no energy withdrawal, i.e., when the disc 22 of the electricity meter is stationary, the rotary speed of the cam plate 36, which is then driven only from the synchronous motor 34, corresponds in speed to the invariable basic charge fixed for the consumer in question.

The reduction ratio of the reduction gear 23, provided between the disc 22 and the sun wheel 30, is chosen so that one complete revolution of the cam plate 36 corresponds both to the meter tariff, i.e. the cost of energy, fixed for the consumer in question, and to a fixed amount of money arranged for this consumer (the "unit amount").

The unit amount fixed for the particular consumer is thus compounded of two tariff quotas, namely the basic charge quota which could be described as "meter rent," and the actual consumption tariff quota, i.e., the energy tariff.

The apparatus shown in FIGURE 4 functions as follows:

Assume the apparatus is ready for operation, i.e. its magazine 63 is filled with cards 64 and the base 62 has been pushed back under the magazine 63, at the same time winding the torsion spring 59 while releasing the ratchet coupling 55 until the lug 71 abuts against the stop pin 72.

If the consumer does not now draw electrical energy from the supply network, then the disc 22 of the electricity meter is stationary and only the synchronous motor 34 is running. This means that the planet wheel drive 26 is now driven only from one side, i.e. from the synchronous motor 34. As a result the rotary speed of the cam plate 36 is a function only of the rotary speed of the synchronous motor 34 and the reduction ratio of the reduction gear 35, and thus only represents the basic charge. As no energy is being consumed the cam plate 36 will therefore turn very slowly.

If the consumer now starts drawing energy from the network at any given moment, the disc 22 starts to rotate, so that the cam plate 36, which continues to be driven by the constantly running synchronous motor 34, undergoes an additional rotary movement which is superimposed on that caused by the synchronous motor 34. The planet wheel gear 26 now receives its drive from two sides, on the one hand from the synchronous motor 34 and on the other hand from the disc 22. Thus the cam plate 36 now performs a rotary movement compounded of two such movements and, depending on the rate at which energy is withdrawn from the network, will rotate more or less quickly, but in any case faster than it did when there was no energy withdrawal.

With no energy withdrawal, then only the basic charge is accounted for in the apparatus, i.e. influences the rotary speed of the cam plate 36. If on the other hand energy is being withdrawn, then the basic charge and at the same time the current energy consumption are both accounted for, with a correspondingly greater rotary speed of the cam plate 36.

Regardless of how long and how intensively the consumer draws energy from the network, and regardless of how often and for how long energy withdrawal is interrupted, i.e. decreases to zero, the following always takes place:

The cam plate 36 turns in the direction of the arrow, either quite fast when energy is being withdrawn, very fast when energy is being withdrawn very intensively, or very slowly when energy withdrawal is at rest. The pin 39 gradually advances up the cam of the cam plate 36, and the angle lever 37 at the same time pivots quite slowly through a small rotary angle against the pull of the tension spring 40 in the opposite direction to the arrow, but otherwise the entire mechanism in the path of action from the brake wheel 43 to the base 62 of the magazine 63 is absolutely stationary.

However, at the moment when the amount of money fixed for the particular consumer (the "unit amount") is reached, i.e. when the apex of the cam on the cam plate 36 passes the pin 39, the pin 39 drops from the cam apex and the angle lever 37 pivots sharply about its shaft 38 in the direction of the arrow by the action of the tension spring 40.

This causes the pin 41 to release the lug 44 and thereby the brake wheel 43, so that the latter, owing to the tension of the torsion spring 59, turns abruptly in the direction of the arrow until, after an almost complete revolution, the abutment of its other lug 45 against the pin 41 blocks it again. During this revolution of the brake wheel 43, however, the torsion spring 59 which brings about the abrupt rotation of the wheel 43 through the engaged ratchet coupling 55, simultaneously advances the base 62 abruptly by the length of one storage division $t$ in the direction of the arrow, through the toothed rack gear 60, 61, whereby the base 62 releases the first card 64 in the storage row and the card drops by virtue of its weight into a receiving box (not shown).

The following deals with the returning of the base 62 and the replenishing of the magazine 63 with cards 64.

The ratchet coupling 55 permits the base 62 to be returned in spite of the presence of the braking device 41, 44 as follows: while the base 62 is being returned, one coupling half 53 performs the slip movement provided for, whereas the other coupling half 52 and the gear 50 fixed thereto do not turn with it but are stationary with the ratchet claws 51 being ratcheted.

The locking means 46, 47, 48 are merely a safeguard to ensure that the base 62 is correctly returned to its starting position when all the cards 64 have been ejected and the magazine 63 is to be "re-loaded." By engaging the ratchet wheel 46, the ratchet 48 ensures that when the base 62 is pushed back below the magazine 63 the coupling half 52, and therewith the gear 50 fixed thereto, are not carried along by the other coupling half 53, rotating with the gear 56; this undesired displacement might otherwise occur as a result of the friction caused by the coupling spring 54 between the ratchet claws 51 of the ratchet coupling 55 which is now performing its slipping function with the effect that the brake wheel 43 could make a complete backward revolution in the opposite direction to the arrow until the rear surface of its lug 44 or 45 abuts the pin 41. The result of such a backward rotary movement on the part of the brake wheel 43 would be that the base 62—even if it had been correctly pushed back until its lug 71 abutted the abutment pin 72—would be brought forward again the length of one storage division $t$ in the direction of the arrow by the torsion spring 59 when the operator released the return pin 73. The first card 64 in the row would thus be released and prematurely ejected. This is evident in that a complete revolution of the brake wheel 43, whether it is made in the direction of the arrow in the course of consumption through the unwinding of the torsion spring 59, or whether it is made in the opposite direction to the arrow through the winding of the torsion spring 59, always represents a displacement of the base 62 the length of one storage division $t$.

The magazine 63 is replenished with cards 64, at the latest, when the last card 64 has finally been ejected from it as a result of the electrical energy consumed. The extended base 62 is then manually pushed back under the magazine 63 by actuating the return pin 73, which also causes the torsion spring 59 to be rewound. Steps which may be taken to ensure that the magazine 63 is replenished with cards 64 in good time so that the consumer's withdrawal of energy is not interrupted will be described later with reference to FIGURE 5.

The possibility of replacing the two enmeshing gears 24 and 25 makes it an easy matter to alter or choose at will the reduction ratio of the reduction gear 23 and thereby the size of the "predetermined unit amount."

Figure 5:
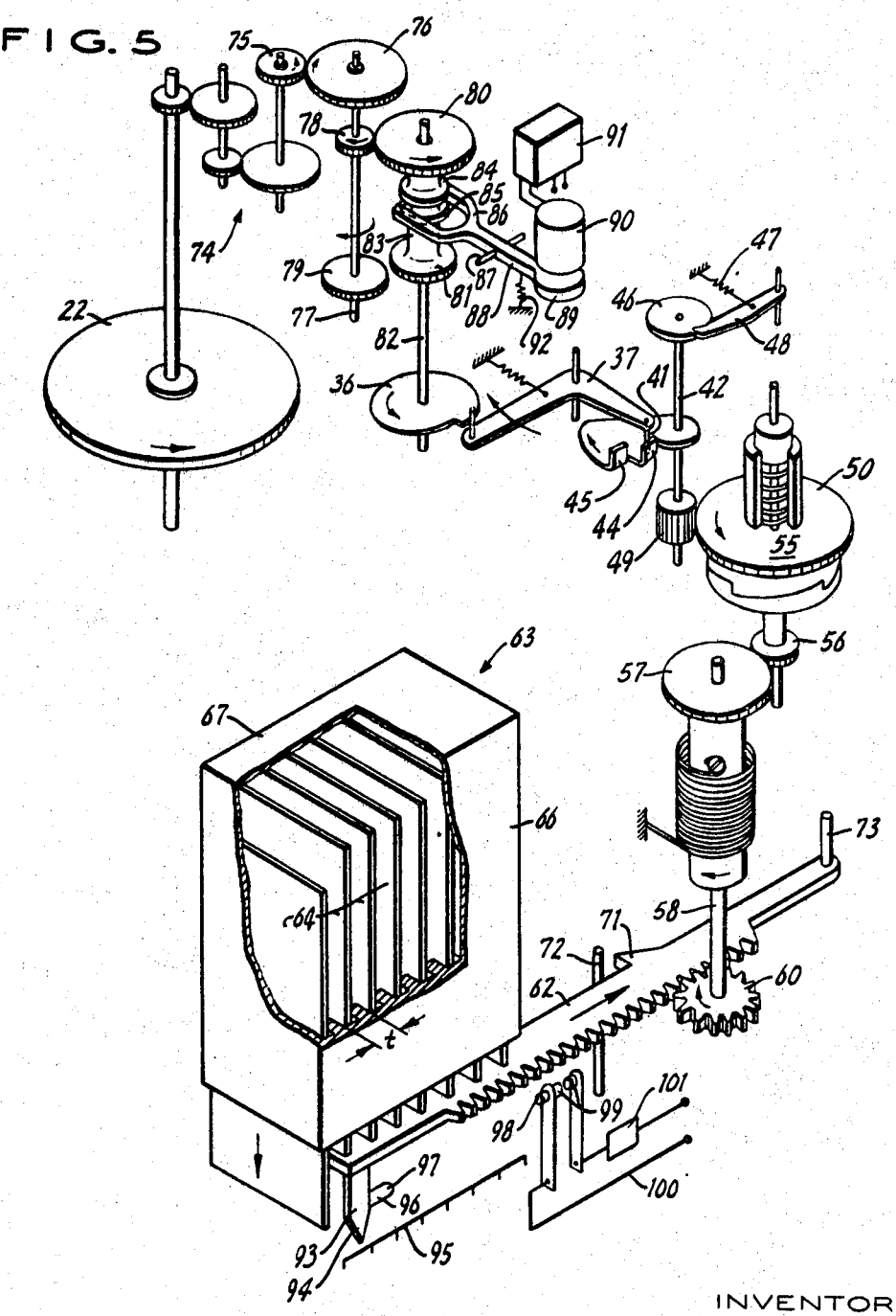
FIGURE 5 is a schematic drawing of an apparatus for carrying out the charging method of FIGURES 2 and 3 in the case of a dual tariff.

In FIGURE 5 the disc 22 of an electricity meter (not fully shown) rotates in the direction of the arrow when current is being consumed, and drives a shaft 77 in the direction of the arrow through a reduction gear 74. Two enmeshing wheels 75 and 76 of this gear can be exchanged for two corresponding wheels with different gear ratio ("exchange wheels") for the purpose of altering the reduction ratio. Two gears 78 and 79, of different diameter, are fixed on the shaft 77, and either the gear 78 can mesh with the gear 80 or the gear 79 with the gear 81, at will. The two gears 80 and 81 are seated on a common shaft 82 about which they can not rotate but axially of which they can be displaced; they form together a slide wheel block 83. The slide wheel block 83 is provided between its two gears 80 and 81 with two flanges 84 and 85, between which there is provided in engaging relationship, an adjustable fork 86. This fork comprises one free end of a two-arm lever 88 which is tiltably mounted on a shaft 87. At the other free end of the lever 88 there is provided a magnetic armature 89 which is operatively connected magnetically to an electromagnet 90, the energizing circuit of which can be closed by a time switch 91. When the electromagnet 90 is not energized, the two-arm lever 88 is held by a tension spring 92 in such a position that slide wheel block 83 assumes an axial position on the shaft 82 whereby the gear 80 engages the gear 78. A cam plate 36 is fixed on the shaft 82.

The cam plate 36 controls a card ejection apparatus in the same way as in the mechanism shown in FIGURE 4. The parts required for this are thus the same as in FIGURE 4 and have therefore been defined and numbered in the same way.

Unlike the construction of the card ejection means in the apparatus shown in FIGURE 4, an arm 93 is here additionally fixed to the base 62. This shows the number of cards 64 still in the magazine 63 by means of a pointer 94 on a scale 95 arranged parallel to the direction of displacement of the base 62. The arm 93 is provided with a finger 96, the contacting surface 97 of which is adapted to close a switch 99 of a circuit 100 through a resiliently mounted contact 98 to thereby activate an optical or acoustic signal emitter 101.

The contact surface 97 has a predetermined spacing relative to contact 98 which is correlated with respect to the size of the card-storage-division $t$ such that the signal emitter 101 is actuated sufficiently prior to issuance of the last card 64 to enable a refilling of magazine 63.

The reduction ratio of the pair of gears 78, 80 is chosen to correspond with one of the two tariffs fixed for the particular consumer, and that of the pair of gears 79, 81 chosen to correspond to the other tariff, the reduction gear 74 providing the necessary basic reduction in both cases.

If different meter tariffs are to be introduced, the two enmeshing spur wheels 75 and 76 need merely be replaced by two corresponding wheels with different gear ratio. By replacing the pairs of wheels 78, 80 and for 79, 81 for corresponding different pairs of wheels, each individual tariff can also be changed to a different one.

Here again, as with the apparatus shown in FIGURE 4, a complete revolution of the cam plate 36 represents a fixed amount or money arranged for this consumer ("unit amount").

The apparatus shown in FIGURE 5 functions as follows:

It is assumed that the time switch 91 has not closed the energizing circuit of the electromagnet 80, i.e. the latter is not energized. In this event the tension spring 92 holds the two-arm lever 88 together with its shift fork 86 (and thereby the slide wheel block 83) in such a position that the gear 80 of the slide wheel block 83 engages the wheel 78 of the shaft 77.

If the consumer now uses electrical energy, the electricity meter commences to operate, and its disc 22, acting through the reduction gear 74 and the enmeshing wheels 78 and 80 drives the cam plate 36 in the direction of the arrow and the cam plate, as already described with reference to FIGURE 4, controls the displacement of the magazine base 62 and thereby the ejection of cards 64 and from the magazine 63.

If the apparatus is to be switched over to the other tariff, then the time switch 91 is actuated thereby closing the energizing circuit of the electromagnet 90, so that the latter is energized and attracts the armature 89. The two-arm lever 88 thereupon tilts about its shaft 87 against the pull of the tension spring 92, the shift fork 86 thus displacing the slide wheel block 83 on the shaft 82 in such a way that its wheel 80 disengages from the wheel 78 whereas its wheel 81 engages the wheel 79. Since, in accordance with the second tariff now obtaining, the reduction ratio of the pair of wheels 79, 81 is smaller or larger than the reduction ratio of the previously effective pair of wheels 78, 80 operable during application of the first tariff, the shaft 82 and thereby the cam plate 36 rotate correspondingly faster or slower than before for a given rate of energy consumption. Consequently it now takes correspondingly less or more time than with consumption at the first, previously used tariff, for the pin 39 to drop off the apex of the cam plate 36, for the angle lever 37 to tilt, for the braking means 41, 44 to release the thrust-drive of the base 62, and for the latter to step forward one storage division $t$ by the torsion spring 59 so that the foremost card 64 in the row falls out of the magazine.

If for example, when the first tariff is used, the cam plate 36 turns at a given rotary speed through a given angle of rotation when a given amount of energy is tapped from the network, then it turns correspondingly more slowly after switching over to a second, lower tariff if energy continues to be withdrawn at the same rate; for the same amount of energy tapped from the network it turns through a correspondingly smaller angle of rotation.

Here again, as with the apparatus of FIGURE 4, a card is ejected each time consumption reaches the amount of money fixed for the consumer, i.e. the fixed unit amount, no matter at which tariff and at what rate the consumer has tapped energy from the network and how often he has changed tariffs.

When the next-to-last card 64 is ejected, the contact surface 97 of the actuator 96 strikes the contactor 98 simultaneously with the stepping forward of the base 62 and thus closes the switch 99, whereby the signal emitter 101 is activated.

The time switch 91 may be replaced by a remote control receiver which receives from the power source changeover impulses corresponding to the change of tariff (for example, day and night tariff).

The principle of the apparatus shown in FIGURE 5 can also be applied to charging for consumption at a multiple tariff consisting of more than two individual tariffs, for example three or four. In this case, in the apparatus shown in FIGURE 5, a larger number of shift wheels, corresponding to the number of tariffs, is provided on the slide wheel block 83, or correspondingly more slide wheel blocks are provided on the shaft 82, and corresponding different drive wheels are arranged on the shaft 77 apart from the drive wheels 78 and 79. In this way reserves can also be provided for tariffs which may be added later.

The basic apparatus illustrated in FIGURES 4 and 5 can also be provided and installed as separate apparatus in addition to a known consumption measuring apparatus, e.g., an electricity meter already in existence. Such additional apparatus can either be fitted directly onto or in the available consumption measuring apparatus or can be arranged in any desired place remote from the existing meter installation, with the member of the consumption measuring apparatus which is displaced by consumption (disc 22 in the apparatus in FIGURES 4 and 5) actuating the braking means 37, 41, 43, 44 of the apparatus according to the invention through remote transmission means. For example, the cam plate 36, by actuating a suitable contactor, could switch on an electric transmitter to energize a remote magnetic impulse relay in the additional apparatus. This impulse relay would then tilt the angle lever 37 of the braking means 41, 44 which controls the card ejection apparatus.

The indicating and signalling means already described with reference to FIGURE 5 are not restricted to the construction of the apparatus shown in FIGURE 5. They can also be used with the construction of FIGURE 4 or with the constructions of FIGURES 6 to 8, to be described hereinafter.

In all the embodiments herein the signalling means (optical or acoustic) can be constructed so as to give a signal each time a card 64 is ejected, i.e. not just when the last or one of the last cards 64 in the storage row is ejected. For this purpose the signalling means can be arranged so that the part which acts as a release member and can be moved in the direction of the storage row (for example the base 62), has an electric contact. Each time the fixed unit amount is reached, the advance of this release member causes the associated contact to travel over a mating contact in a row of stationary contacts spaced from each other by the length of the storage division $t$ and oriented parallel to the storage row. This action temporarily closes an auxiliary circuit, thus actuating a time relay adjustable to the desired length of the signal; the relay thus closes a signal-emitting circuit and keeps it closed for the predetermined duration of the signal.

The cards themselves are preferably used as bills and, as such, are pre-printed with the amount payable and any other data, such as a progressive number for checking payment and a special means of identifying the consumer in question, for example, a code number.

The cards 64 may also be marked on issue with the date of issue by a special printing means provided in the meter.

However, the cards 64 used as bills may also be in the form of punched cards which are further processed in conventional accounting and charging machines at the accounts department.

The cards 64 used as bills can preferably be torn in two, and are, for example, perforated. One part is then returned to the consumer receipted when the bill has been paid, and the other part, which may be in the form of a punched card, is forwarded to the accounts department.

The cards 64 may be designed as postcards which the consumer posts to the competent office when they are ejected.

They may also be relatively small and contain the preprinted data in a form which can be mechanically interpreted, for example as code signs which, following ejection of the card, are transferred to normal punched cards by an interpreting and transferring apparatus.

Each ejection of a card, i.e. each issue of a bill, can in addition be indicated in the accounts department through a signal channel, either as a check or for automatic recording for statistical or other registration purposes. The signal-emitting means already described, which are provided to generate a signal in the apparatus, i.e. at the consumer's house, each time a card 64 is ejected, can be employed for this purpose.

Figure 6:
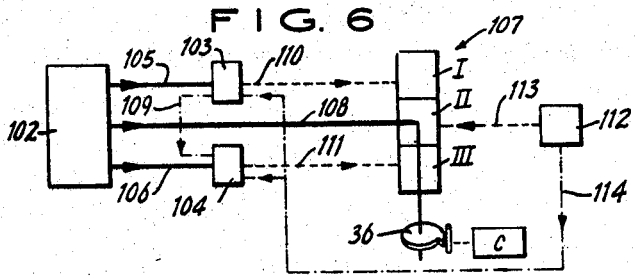
FIGURE 6 is a schematic block diagram of an apparatus for carrying out the charging method of FIGURE 2 in the case of a block tariff.

In FIGURE 6 an electricity meter 102 is arranged for a block tariff having three blocks. For the first block a block counter 103 is provided and for the second block a block counter 104; no counter is provided for the third block. The electricity meter 102 may alternatively drive either the block counter 103 as indicated by the heavy line of action 105 or the block counter 104 as symbolized by the second heavy line of action 106. The counters 103 and 104 control the setting of a reduction gear assembly 107 as described hereinbelow.

The electricity meter 102 also constantly drives a reduction gear 107, shown diagrammatically. As in the case of the slide wheel block 83 in FIGURE 5, this is in the form of a shiftable gear assembly. In this case however, the assembly can be switched into three different states, I, II, III, corresponding to the three blocks i.e. to three different reduction ratios.

The reduction gear 107 drives a cam plate 36, which again, as with the apparatus in FIGURES 4 and 5, actuates a card-ejection means C. The cam plate 36 is adapted to turn at three different rotary speeds for a given consumption rate in dependence on the three different reduction ratios of the gear 107 and in accordance with the setting of the reduction ratios I, II, III. The path of action from the electricity meter 102 through the reduction gear 107 to the cam plate 36 is diagrammatically illustrated by a heavy line 108.

If, for example, the whole block tariff counting mechanism is set to zero, and if the consumer in question starts to tap energy from the network, then state I of the reduction gear 107, i.e. its smallest reduction ratio, is switched on and, apart from the electricity meter 102, only the block counter 103 for the first block is operative. The cam plate 36 then turns at the greatest rotary speed, for a given consumption rate as established by state I of the reduction gear 107. State I has the smallest reduction ratio. The plate is driven via meter 102, coupling 108 and the active section of 107.

When, following such withdrawal of energy from the network, the block counter 103 reaches a specific amount of energy fixed for the first block, i.e. when the first block is used up, the block counter 103 automatically uncouples itself from the electricity meter 102 and simultaneously couples the block counter 103 (which was previously at zero) to the meter 102 as shown in FIGURE 6 by the broken line of action 109. At the same time the block counter 103 also switches over the gear 107, as indicated by the broken line of action 110, from state I to state II, the latter having a greater reduction ratio than state I. Thereafter the block counter 104 starts counting and the cam plate 36, in dependence on the greater reduction ratio of the state II, turns at a lower rotary speed for a given consumption rate than it turned at with the ratio of state I actuated.

The block counter 104 counts until the specific amount of energy fixed for the second block is reached, i.e. until the second block is used up. It then automatically uncouples itself from the electricity meter 102 and simultaneously switches over the reduction gear 107, as indicated by the broken line of action 111, from the state II to the state III, the latter again having a larger reduction ratio than the state II. The ensuing energy consumption now takes place without being monitored by any block counter, and now the cam plate 36, in dependence on the largest reduction ratio, given by the state III, turns at its lowest rotary speed for a given energy consumption, i.e. at a speed still lower than that determined by the reduction ratio of the state II.

A time switch 112, which may be replaced by a remote control receiver, returns the apparatus to zero and to its initial state each time a given period of time has elapsed. That is to say, at this time it switches the reduction gear 107 back to the original state I, which action is represented in FIGURE 6 by the broken line of action 113; at the same time it returns the two block counters 103 and 104 to zero as indicated by the broken line of action 114.

Now the sequence already described recommences: When the first block is used up the second block is started. When that is used up the third block is started. When the given length of time is reached the time switch 112 switches back the whole apparatus, so that a new first block can be started, regardless of which block was being used at the time, and regardless of whether the second or third block has been started at all.

Here again the reduction gear 107 is disposed so that one complete revolution or a number of complete revolutions on the part of cam plate 36 result in the ejection of a bill for the amount of money fixed for the consumer in question.

It is not in fact necessary for the cards to be stored in the magazine in such a way that one is ejected following each full revolution completed by the cam plate 36. On the basis of a larger storage division amounting to a whole multiple of $t(t_1=n.t)$, the cards can be stored so that one is issued after the cam plate 36 has made several complete revolutions.

Figure 7:
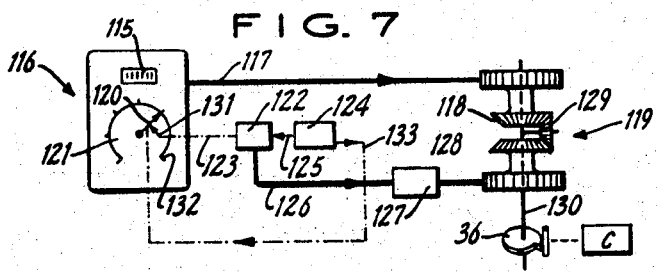
FIGURE 7 is a schematic diagram of an apparatus for carrying out the charging method of FIGURE 2 in the case of a maximum tariff.

In FIGURE 7 a consumption counter 115 of a maximum meter 116, shown diagrammatically, drives as indicated by the heavy line of action 117, one sun wheel 118 of a planet wheel gear 119 when energy is being tapped from the network. A driven pointer 120 of a maximum mechanism 121 of the maximum meter 116 shows the maximum reached during each reading period. Its position at any given time can be sensed by sensing means 122 as indicated by the broken line of action 123. A time member 124 (for example a time switch or a remote control receiver) controls the sensing means 122 by way of a coupling signified by the line 125, so that the means 122 performs the sensing action at the end of each reading period, for example at the end of each month. During the sensing action only, the sensing means 122, as indicated by the heavy line of action 126, and through a step-up gear 127, drives another sun wheel 128 of the planet wheel gear 119. Both sun wheels 118 and 128 of the planet wheel gear 119 are operatively connected to a planet wheel shaft 130 through a planet wheel 129. The shaft 130 carries a cam plate 36 which, as in the apparatus of FIGURES 4, 5, and 6, controls a card-ejection means C.

In the scanning operation a scanner 131 of the sensing means 122, starting from the zero position 132 of the pointer 120, scans the range of the angle of rotation covered by the pointer 120 and thus the maximum advance of the pointer 120. Simultaneously with this operation, the sensing means 122 transmits an impulse corresponding in length to the angle range of the pointer 120 to the planet wheel gear 119 via the transmission path 126. This is transmitted as a rotary path impulse through the step-up gear 127 to the sun wheel 128 of the planet wheel gear 119. Immediately after the scanning operation the time member 124 returns the pointer 120 to zero via the coupling indicated by the line of action 133.

The sensing means 122 can be adapted to sense the position of the pointer 120 not just once a month but at shorter intervals, for example once each day, so that it can transmit correspondingly dimensioned rotary path impulses to the step-up gear 127 at more frequent intervals. In this case, of course, the pointer 120 will be returned to zero by the time member 124 not after each sensing operation but rather only once a month.

In a further construction of the sensing means 122, it is only when the pointer 120 has covered a given angle range, i.e. only when a given maximum value is indicated by the pointer 120, that the sensing means transmits in impulse form the portions of the angle range of the pointer 120 exceeding this maximum to the step-up gear 127 and thereby to the cam plate 36. Thus in this case only that part of the maximum performance which exceeds a predetermined performance value is accounted for by the higher tariff on which charging is based. Here again the higher tariff (maximum tariff) is manifested in an increased speed of the cam plate 36, i.e. other consumption conditions being equal, in an earlier issue of a bill.

The maximum region defined by the angular range of the pointer 120 may also be divided into sectors, i.e. into adjoining sectional regions, each corresponding to a different maximum tariff. The rating is then allocated such that, for example where there are three sectional regions, the first, reckoned from the zero position 132 of the pointer 120, refers to a higher maximum tariff, and the deflections of the pointer 120 beyond this region refer to the highest maximum tariff. At each crossing of the tariff boundary, i.e. each time the scanner 131 crosses the boundary of a sectional region, the step-up ratio of the gear 127 is altered.

The sensing means 122 may also transmit impulses to the step-up gear 127, not by providing just one impulse corresponding in length to the angular range of the pointer 120, but by providing several successive impulses, each corresponding to a given portion of the angular range covered by the pointer 120, for example a degree.

Other known charging methods and tariffs can be realized with the aid of the sensing process described in conjunction with the charging apparatus according to the invention, and there is also the possibility of introducing completely novel charging methods and tariffs which exploit the features thereof.

Figure 8:
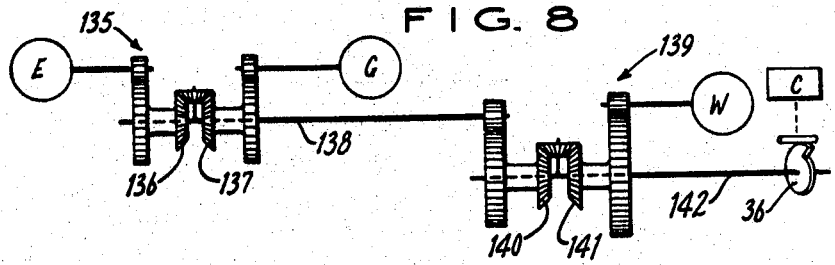
FIGURE 8 is a schematic diagram of an apparatus for carrying out the charging method of FIGURE 2 for several consumption media.

In FIGURE 8 a planet wheel gear 135 is driven on the one hand by an electricity meter E through a sun wheel 136 and on the hand by a gas meter G through a sun wheel 137. A planet wheel shaft 138 of the gear 135 forms one driving of a second planet wheel gear 139 by driving one of its sun wheels 140. The other drive-side of the gear 139 is constituted by a sun wheel 141 driven by a water meter W. A planet wheel shaft 142 of the gear 139 carries a cam plate 36 which, as in the apparatus in FIGURES 4 to 7, controls a card-ejection means C.

It may be noted in all constructions of the apparatus according to the invention, including the examples described, (see FIGURES 4 to 8) that the same implement a novel charging principle, namely charging for consumption each time an invariable amount of money, fixed for the consumer in question and compounded of at least two tariff quotas, is reached, and that many types of tariffs may be realized with the aid of this new apparatus. The invention is accordingly not limited to the specific mechanisms shown and described but departures may be made therefrom within the scope of the accompanying claims without departing from the principles of the invention and without sacrificing its chief advantages.

This application contains subject matter related to subject matter disclosed in application Ser. No. 440,419 of Abraham Rutenberg, filed Mar. 17, 1965, now abandoned, which application is a continuation-in-part of Ser. No. 8,398, filed Feb. 12, 1960, now abandoned, for "Method of Accounting for the Consumption of Electricity Gas or Liquid and Arrangements for Carrying Out Such Method," which application is assigned to the same assignee of the rights to the instant application.

What is claimed is:

1. Apparatus for charging for the consumption of a flowing medium by a consumer installation connected to a supply network for the medium, comprising consumption measuring means connected between said network and said consumer installation and means coupled to said measuring means for automatically issuing bills identifying said consumer installation upon the expenditure of a predetermined monetary amount representing the consumption of said medium in accordance with at least two tariffs, said bill issuing means comprising a plurality of translating means, one of said translating means being responsive to and translating the output of said measuring means in accordance with one of said tariffs, control means responsive to said one translating means, and bill release means responsive to said control means and adapted to release said bills in succession, each bill being issued upon expenditure of said predetermined monetary amount.

2. Apparatus according to claim 1 in which said control means comprise rotary means having a speed controlled according to the output of said translating means.

3. Apparatus according to claim 1 including means for selecting the output of one of said translating means and coupling said selected output to said control means.

4. Apparatus according to claim 1 including means for measuring the consumption of another medium and in which another of said translating means is responsive to said other medium.

5. Apparatus according to claim 3 including time measuring means coupled to said selecting means for actuating said selecting means after a predetermined time interval.

6. Apparatus according to claim 3 including time measuring means and counting means coupled to said selecting means for actuating said selecting means after a predetermined time interval and after predetermined medium consumption, respectively.

7. Apparatus according to claim 1 in which said consumption measuring means comprise a maximum indicating meter having consumption counting means and maximum indicating means, and including timing means and sensing means and scanning means responsive to said maximum indicating means, one of said translating means being responsive to said counting means and another of said translating means being responsive to said sensing and scanning means, said timing means being adapted to periodically actuate said sensing means and thereafter to zero said indicating means.

8. Apparatus according to claim 1 in which said bill release means comprise a magazine having a plurality of bills disposed therein and a movable retaining member incrementally moved by said control means to release said bills in succession.

9. Apparatus according to claim 1 in which said control means comprise spring actuated, normally stationary structure transiently moved a predetermined amount when said one translating means translates a predetermined amount of the output of said measuring means.

10. Apparatus according to claim 9 including reset means for retensioning said spring actuated structure and for resetting said bill release means.

11. Apparatus according to claim 1 in which one of said tariffs comprises a nominal charge and including means for actuating one of said translating means independently of said consumption for introducing said nominal charge.

12. Apparatus according to claim 1 including means for disabling said one translating means and activating another of said translating means upon the consumption of an assigned monetary amount of said medium.

13. Metering apparatus comprising measuring means connected to a supply network, control means connected to be responsive to said measuring means and having means for supplying multiple outputs representing different multiple responses to said measuring means, actuating means for selecting one of said outputs and bill release means responsive to said actuating means.

References Cited

UNITED STATES PATENTS 2,538,243   1/1951   Hazard et al. _____ 222—25

STANLEY H. TOLLBERG, *Primary Examiner.*

ROBERT B. REEVES, *Examiner.*